UNITED STATES PATENT OFFICE.

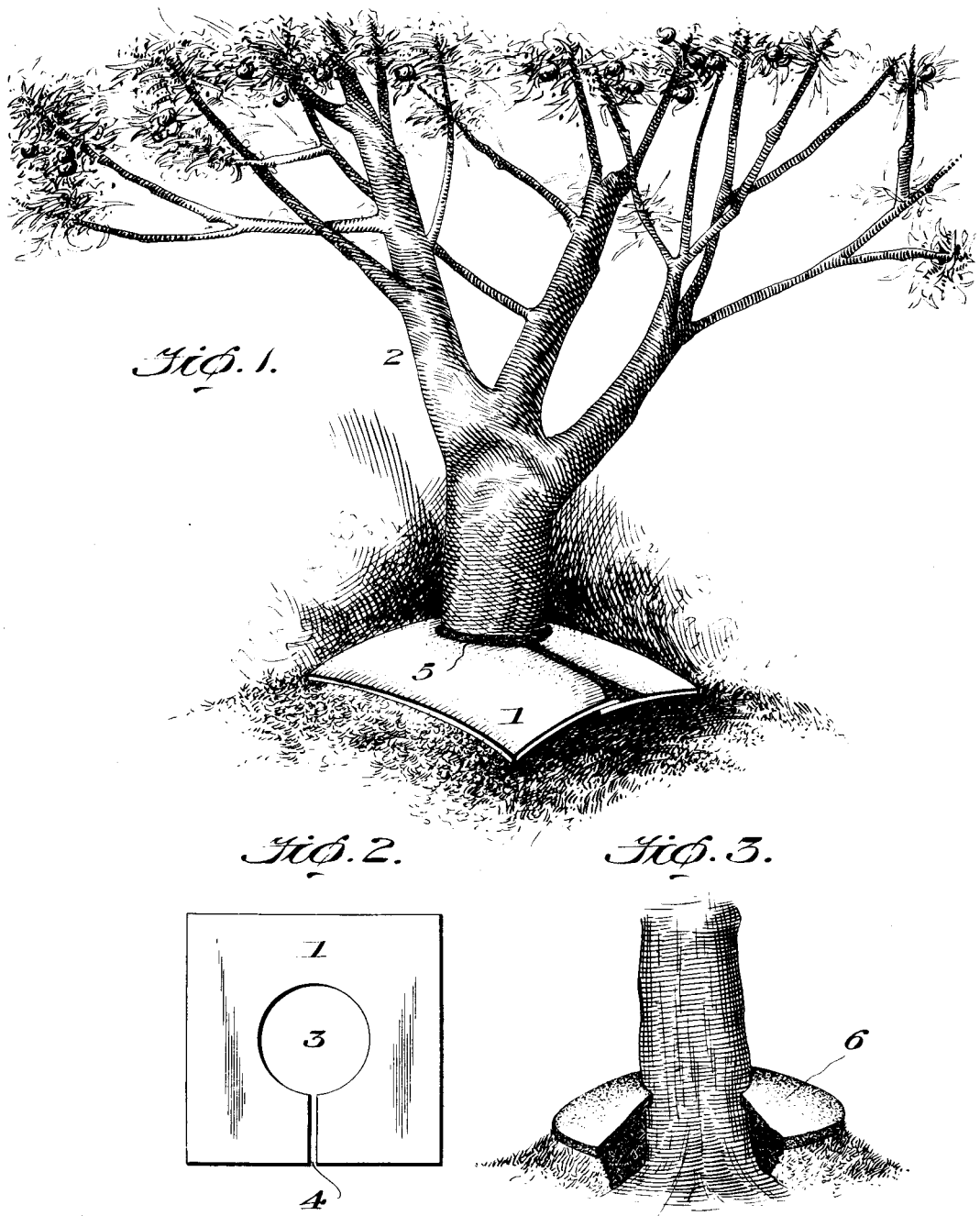

WILLIAM M. SCOTT, OF BALTIMORE, MARYLAND.

TREE PROTECTION.

1,130,545.   Specification of Letters Patent.   Patented Mar. 2, 1915.

Application filed September 30, 1914. Serial No. 864,308.

*To all whom it may concern:*

Be it known that I, WILLIAM M. SCOTT, a citizen of the United States, residing at Baltimore, State of Maryland, have invented certain new and useful Improvements in Tree Protection, of which the following is a specification, reference being had therein to the accompanying drawing.

This invention relates to the protection of trees from the injurious effect of insects and the like.

The primary object of the invention is to encircle the trunk of a tree, at the ground-line portion thereof, with a protecting structure which comprises instrumentalities that are impervious to insects and so constituted as not to interfere with the growth of the tree.

Another object is to attach to the trunk of a tree, at the ground-line portion thereof, an encircling instrumentality and to seal the same to the tree in such manner that it will act as a barrier to insects and yet have the capacity to expand or enlarge with the growth of the tree.

A more specific object is to encircle the trunk of a tree, at the ground-line portion thereof, with a protecting instrumentality which, though flexible, is none the less impenetrable to tree borers and to effect its sealed attachment thereto in such manner that the instrumentality will have a surface contact with the ground and thereby prevent the migration of insects downwardly on the surface of the tree and, also, inwardly along the ground to the tree.

Still another specific object of the invention is to provide a method of protecting trees against borers and the like which consists in encircling a tree trunk, at the ground-line portion thereof, with a protector which is composed of flexible material that is impenetrable to insects and which is so formed as to lie in surface contact with the ground substantially throughout the area of the protector, the latter being impenetrably sealed to the tree trunk and so as to have an expansible adherence thereto.

The invention in general seeks to provide means which, from an operative standpoint, have in practical use been found to possess a high degree of efficiency and which, structurally considered, are of great simplicity.

The invention resides broadly in the method of applying the structure to the tree at a particular portion thereof, all as hereinafter explained, and the scope of application of which will be indicated in the claims hereto appended.

In order that it may be clear how the invention is practised, drawings illustrative of instrumentalities which may be utilized therewith, and the manner of attachment thereof to trees, are hereto appended.

In these drawings: Figure 1 is a view of a tree with a protecting-device (constructed in accordance with one embodiment of the invention) applied thereto; Fig. 2 is a detail view of the protecting-device, detached; and Fig. 3 is a fragmentary view in perspective, and partly in section, of a somewhat different embodiment.

Referring to the drawings, it will be noted that 1 designates a protector-instrumentality or guard-element which, in this instance, is shown as a mat or pad encircling a tree at the base thereof. This mat-instrumentality may be constructed of any desired dimensions and form. It is made of any suitable material or substance which is flexible, more or less pliable or expansive, and absolutely impervious to the insects.

Preferably and as shown, the mat is closely fitted around the trunk 2 of a tree at or near the ground. It is preferably so formed and dimensioned as completely to cover the soil over a radius of approximately six inches from the bark of the tree.

In the embodiment of the invention exemplified in Figs. 1 and 2, the protector-instrumentality is preferably made of tarred paper, tarred burlap, felt, or other suitable fabric. It is, in this instance, provided with a central opening 3 of such diametral dimensions and shape as to conform to the tree-trunk to which it is to be applied. As shown, it outstands from the tree and overlies the soil sufficiently to constitute an effectual barrier to the borer. To facilitate its application to the tree, the protector-mat is, in this instance, cut or slit radially, at 4, from its outer edge to the edge of the opening. To attach it to the tree-trunk, I employ, in this particular exemplification, a viscous substance 5 which, being spread along the edges of the central opening, securely conjoins it and the tree and, by reason of the fact that, when it is applied, it is in a plastic condition, preferably, it effects an absolute sealing of the protector-element to the tree. For sealing the openings around the trunk and along the lapped edges of the mat, any viscous substance that will not crack or dissolve away during the course of a summer and that will not injure the tree, may be used, such as soft pitch, coal-tar (with the injurious acids and oils distilled off), asphalt (with a low melting point), wax, pine tar, etc. In practice, I have found that the residue from the distillation of coal tar reduced to a melting point of 108° to 115° F., constitutes a very satisfactory material for this purpose. Not only can the insects not penetrate the element itself, but the viscous material precludes their migration from the upper surface of the mat, or from the surface of the tree, downward between the bark of the tree and the mat. I have, in this way, provided an outstanding protector-instrumentality which is flexible and impenetrable to the insects, and a means for sealing the instrumentality to the tree, the sealing mass being likewise impervious to such insects.

I find, in practice, that it is advantageous to mound the soil a few inches high around the tree, as shown in Fig. 1, and this gives the protector-mat a roof-like slope.

In Fig. 3, I have shown, as another exemplification of my invention, a guard 6 formed entirely, or substantially, of a viscous substance, such as asphalt, tarry substances, or the like, and having the characteristics of being impenetrable to the insects and, also, of being pliable, flexible, or expansible so that it shall not injure the tree in its growth, etc. In this instance, the mass is laid around the base of the tree; it is pressed or otherwise manipulated to force it closely around the surface of the tree so as to effect an absolute and impenetrable sealing thereof to the tree. By these different forms of structure, I have provided a simple and effective barrier to the migration of borers to the roots, etc., of trees, like the peach, plum, apple, etc.

The peach-tree borer (the larva of the moth *Sanninnoidea exitiosa,* Say) is, perhaps, the most destructive insect-enemy of the peach-tree; and, owing to its habit of feeding on the inner bark thereof and mainly below the ground, it cannot be successfully controlled by the ordinary spraying method employed with success in the destruction of other injurious fruit-tree insects. The remedy most commonly employed by peach growers in all large peach-orchards, is expensive, laborious and, at best, only partially successful. It consists in an operator removing the soil from the base of the tree and, on his hands and knees, cutting out the borers with a knife. This operation is performed annually in the fall or spring after considerable damage will inevitably have been done, for the reason that the worms will have entered the trees during the summer, beginning (generally) about the middle of June. The female borer moth deposits her eggs mainly on the trunk of the tree. The eggs hatch in about ten days and the young, delicate larvæ immediately seek the moist, tender bark below the surface of the soil. A few may enter above ground through wounds or large cracks on the trunk; but, with these rare exceptions, they crawl or drop down below the surface through the space between the bark and the soil.

As shown by the literature on the subject, numerous attempts have been made to overcome the trouble by applying various kinds of washes and paints to the trunks of the trees for the purpose of repelling the moths, of poisoning the larvæ, or of obstructing their entrance to the bark. This method of treatment has proved to be unsatisfactory for the reason that the borers go below the ground and enter the bark below the coating of wash, or through cracks made by the growth of the tree. Moreover, washes that form an impervious coating over the bark usually prove to be more or less injurious to the tree. Likewise, the envelopment of the tree trunks with wire-netting, wood veneer, tarred paper, metallic guards, and the like, have largely failed for the reason that the borers go downward and find their way to the tree below the obstruction, penetrate the guards, or crawl through the unsealed openings in the guards or between the guards and the tree.

I am aware that it has heretofore been proposed to provide so-called tree guards made of wood, metal, burned clay, and other non-yielding material. In these instances, because of the fact that the guards do not yield, they endanger the tree. Moreover, they are usually not placed so as to preclude the borers from entering the tree below them. Still again, they are not sealed to the tree.

My invention seeks to prevent such descent of the borers and where the hereinabove described means is provided, it operates to hold them above the ground where (being unable quickly to penetrate the dry, tough and exposed bark) they soon perish, their habit and instinct being to reach the moist, tender bark under the surface of the soil as soon after hatching as possible. Therefore, it is a primary object of the present invention, in both of the herein exemplified embodiments thereof, to prevent the delicate, newly-hatched borers from finding their way to the tender, moist bark of the trunk and roots below the surface of the soil and, thus, to leave them to perish.

The application of this invention may be illustrated as follows: In treating peach-trees, for example, I take a piece of tarred paper (for instance) about sixteen inches square, slit it to the center, and cut out a circular hole at the center sufficiently large snugly to fit the trunk of the tree near the ground. After mounding and smoothing the soil about the tree, I encircle the trunk with the prepared mat, lapping the edges thereof along the slit. I then take a residue of coal tar distillation (or other similar material) in a semi-liquid or plastic condition and apply it (with a brush or small stick) to the lapped edges of the paper (thus gluing them together), and around the tree-trunk entirely to close all openings and spaces between the bark and the inner edge of the mat.

I have found that peach-trees treated in the above manner have remained free from borers throughout the year while adjacent trees left unprotected became badly infested. Moreover, my improved method of treatment will prolong the life of a tree from the present normal maximum of eighteen years approximately to thirty years, for the reason that, as the borers shorten the tree's life at least ten years, my device, in preventing the borers from reaching the susceptible parts, precludes the tree from being thus injuriously affected.

Under the term "borer" I mean to include not only the species that commonly infests the peach and other stone fruit trees east of the Rocky Mountains but, also, the peach borer of the Pacific coast; the round-headed apple-tree borer; and any other boring insect that attacks tree trunks near the ground or below the surface of the soil.

It is also a feature of my improved protector-structure that, by reason of the fact that it covers the tree-trunk at a rather tender point, the protector prevents the base and crown thereof from freezing.

As many different forms of instrumentalities may be employed in the practice of the invention and as numerous methods of carrying it into effect are possible, without departing from the spirit thereof, it is intended that all matter contained in the foregoing description and shown in the accompanying drawings shall be interpreted as illustrative and not in any limiting sense.

It is also to be understood that the language employed in the following claims is intended to cover not only the specific features of flexible, insect-impenetrable material of tures as well.

What I claim is:

1. A method of protecting trees against borers and the like which consists in encircling a tree-trunk, at the ground-line portion thereof, with a protector composed of flexible, insect-impenetrable material and formed to lie in surface contact with the ground substantially throughout the area of the protector and having an impenetrably-sealed and expansive adherence to the tree-trunk.

2. A method of protecting trees against borers and the like which consists in encircling a tree-trunk, at the ground-line portion thereof, with a protector composed of flexible, insect-impenetrable material of relatively wide outspreading area, the instrumentality being formed to lie in surface contact with the ground substantially throughout its area and having an expansible and impenetrably sealed adherence to the tree-trunk.

3. A method of protecting trees against borers and the like which consists in mounding the ground that surrounds the tree and encircling its trunk, at the ground-line portion thereof, with a protector composed of flexible, insect-impenetrable material and formed to lie in surface contact with the mound substantially throughout the area of the protector, the latter having an impenetrably-sealed and expansive adherence to the tree-trunk.

4. A method of protecting trees against borers and the like which consists in encircling a tree-trunk, at the ground-line portion thereof, with a flexible, insect-impenetrable protector-instrumentality so that it lies in surface contact with the ground substantially throughout the area of the instrumentality, and effecting an impenetrable and expansible adhesion between the instrumentality and the tree-trunk.

5. A method of protecting trees which consists in encompassing the tree at the ground-line with an outstanding, flexible protector-instrumentality that is impenetrable to insects and effecting an insect-obstructing contact of the instrumentality with the ground by disposing it in surface contact therewith substantially throughout the area of the instrumentality and, then, effecting an impenetrable sealing of the instrumentality expansibly to the tree while said instrumentality is in contact with the ground.

6. A method of protecting trees against borers and the like which consists in mounding the ground around a tree; then encircling the trunk thereof, at its ground-line portion, with a flexible protector that is impenetrable to insects; and, then, effecting an insect-obstructing contact of the protector with the mound by impenetrably sealing the same expansibly to the tree-trunk and with substantially its entire area in surface contact with the mound.

In testimony whereof I affix my signature in presence of two witnesses.

WILLIAM M. SCOTT.

Witnesses:
ROBERT KANTER,
ESTELLA M. SEBOUR.